US007491932B2

(12) United States Patent
Thakur et al.

(10) Patent No.: US 7,491,932 B2
(45) Date of Patent: Feb. 17, 2009

(54) MULTIPOLE ION GUIDE HAVING LONGITUDINALLY ROUNDED ELECTRODES

(75) Inventors: Rohan A. Thakur, Los Altos, CA (US); Maurizio Splendore, Walnut Creek, CA (US); Eloy R. Wouters, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 235 days.

(21) Appl. No.: 11/454,263

(22) Filed: Jun. 16, 2006

(65) Prior Publication Data

US 2008/0067365 A1 Mar. 20, 2008

(51) Int. Cl.
*H01J 49/42* (2006.01)
*B01D 59/44* (2006.01)

(52) U.S. Cl. ........................ 250/292; 250/288; 250/284

(58) Field of Classification Search ................. 250/292, 250/283

See application file for complete search history.

(56) References Cited

U.S. PATENT DOCUMENTS

| | | | | |
|---|---|---|---|---|
| 6,730,904 | B1 * | 5/2004 | Wells | 250/292 |
| 6,926,783 | B2 * | 8/2005 | Loucks, Jr. | 156/73.6 |
| 2003/0136905 | A1 * | 7/2003 | Franzen et al. | 250/292 |
| 2004/0262511 | A1 * | 12/2004 | Kato | 250/281 |
| 2005/0067564 | A1 * | 3/2005 | Douglas et al. | 250/290 |
| 2005/0258364 | A1 * | 11/2005 | Whitehouse et al. | 250/292 |
| 2006/0118716 | A1 * | 6/2006 | Michaud et al. | 250/292 |
| 2008/0067365 | A1 * | 3/2008 | Thakur et al. | 250/292 |

* cited by examiner

*Primary Examiner*—Jack I Berman
*Assistant Examiner*—Johnnie L Smith, II
(74) *Attorney, Agent, or Firm*—Charles B. Katz

(57) ABSTRACT

An ion guide having a plurality of spheroidal or similarly shaped electrodes is disclosed. The electrodes are arranged in pairs about a central ion flow axis, and an RF voltage is applied in a prescribed phase relation to create an electric field that focuses and radially confines an ion beam. A defocusing effect associated with the electrode shape may be reduced by placement of a separate skirt electrode immediately downstream in the ion path, or by forming the electrodes in a composite structure, whereby the trailing portion of the electrode is fabricated from or coated with an insulative material.

19 Claims, 5 Drawing Sheets

MULTIPOLE ION GUIDE HAVING LONGITUDINALLY ROUNDED ELECTRODES

BACKGROUND OF THE INVENTION

1. Field of the Invention

The present invention relates to the field of mass spectrometry and more specifically to an ion guide and its method of use.

2. Discussion of Related Art

Ion guides are well known in the mass spectrometry art for the efficient transport of ions between regions of successively reduced pressure. The ion guide generally includes a plurality of electrode pairs arranged symmetrically about the central longitudinal ion flow axis. An oscillating radio frequency (RF) voltage is applied in a prescribed phase relationship to the electrode pairs to generate a multipole field that confines ions to the interior of the ion guide. While quadrupole ion guides (consisting of two electrode pairs to which opposite phases of the RF voltage are applied) are most commonly employed in mass spectrometers, multipole ion guides utilizing a greater number of electrode pairs and generating higher-order fields (e.g., hexapole or octopole) are also known.

The electrodes of prior art multipole ion guides generally take the form of conductive rod electrodes, having a substantially invariant lateral cross-section, elongated along the central ion flow axis. Typically, the rod electrodes have a cylindrical shape with a circular lateral cross-section. It is also known to use rod electrodes having a square lateral cross-section, although such electrodes generate a greater degree of higher-order electric fields, which may have an adverse effect on transmission efficiencies. In order to produce a "purer" quadrupolar field, it is known to use rod electrodes having a complex cross-section with a hyperbolic inner facing surface, but hyperbolic rod electrodes are difficult and expensive to manufacture, and so their use is typically limited to devices, such as linear ion traps and quadrupole mass filters, in which control and characterization of the generated field is critical.

One problem exhibited by prior art ion guides is the occurrence of field breakdown, causing arcing (spark discharge) between adjacent electrodes. The rod electrodes terminate at their ends in flat faces, thereby defining sharp corners that facilitate arcing. Arcing, which may result in substantial damage to the electronics and data system, may be particularly problematic when the ion guide is positioned within a region of relatively high pressure and/or when fields of relatively great magnitude are employed.

SUMMARY

Roughly described, an ion guide constructed in accordance with an embodiment of the present invention includes a set of electrode pairs positioned symmetrically about a central ion flow axis. Each electrode has a spheroidal or similar shape that presents a continuously rounded surface in the longitudinal plane. An RF voltage is applied to the electrode pairs in a prescribed phase relationship to generate an RF field that focuses incoming ions to the flow axis and radially confines the ions within the ion guide interior volume. The converging rounded surfaces of the electrodes create curved isopotential lines (away from the central ion flow axis) that assist to focus ions to the flow axis at the ion guide entrance.

In specific embodiments, the defocusing effect associated with the diverging portions of the electrode surfaces may be reduced either by positioning an electrode immediately adjacent to and downstream of the ion guide, or by providing a composite structure to the electrodes consisting of a conductive portion located proximal to the ion guide entrance, and a non-conductive portion located proximal to the ion guide exit.

DETAILED DESCRIPTION

In the following description of a multipole ion guide having spheroidal electrodes, numerous specific details are set forth in order to provide an understanding of the claims. One of ordinary skill in the art will appreciate that these specific details are not necessary in order to practice the disclosure. In other instances, well-known components or methods are not set forth in particular detail in order not to obscure the present invention. Thus, the specific details set forth are merely exemplary. Particular implementation may vary from these exemplary details and still be contemplated to be within the spirit and scope of the present invention.

Figure 1:
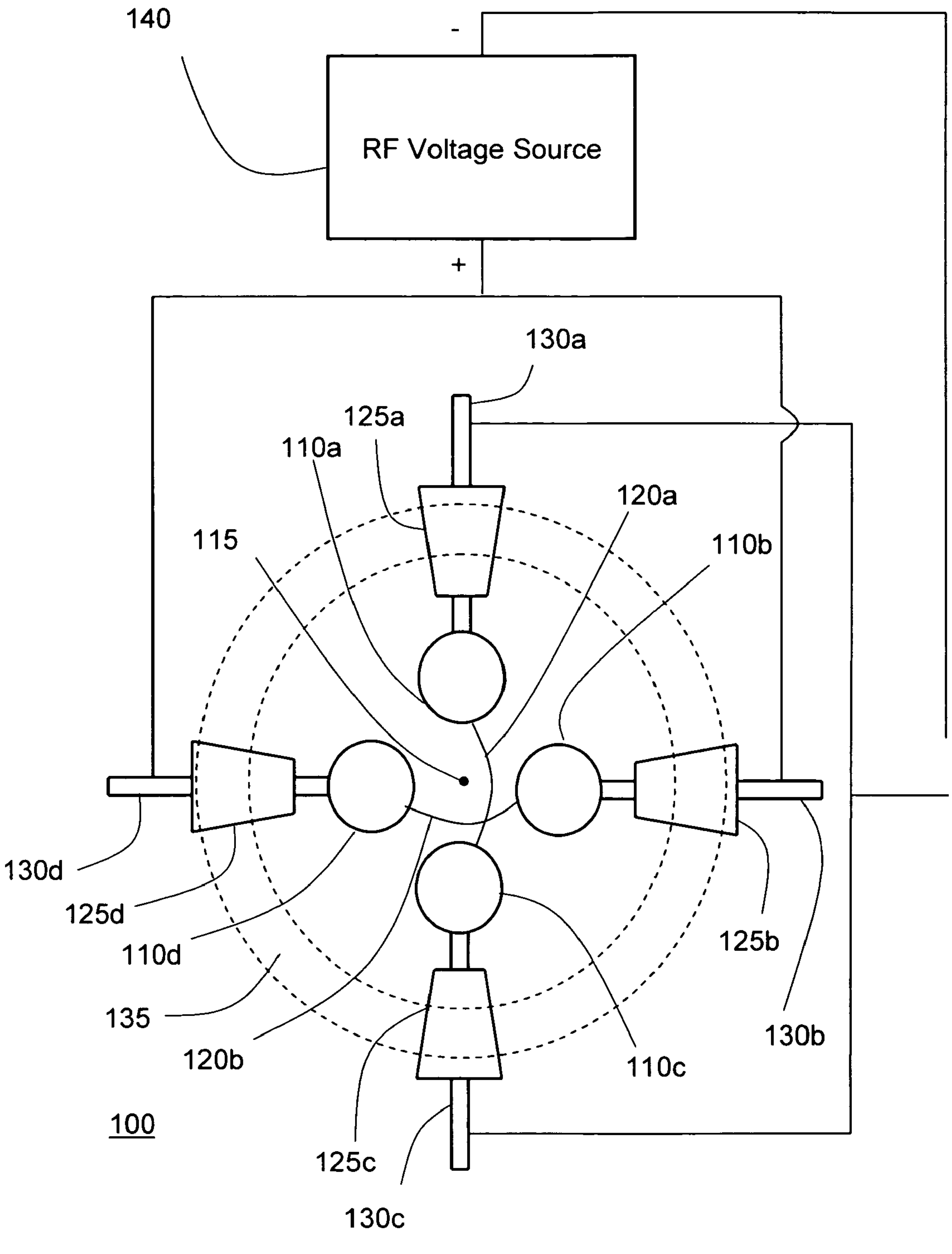
FIG. 1 is a front elevational view of a quadrupole ion guide constructed in accordance with an embodiment of the present invention.

FIG. 1 is a front elevational view of a quadrupole ion guide 100 constructed according to a first embodiment of the invention. Ion guide 100 includes four electrodes 110*a*, 110*b*, 110*c* and 110*d* arranged around a central ion flow axis 115 (noting that axis 115 extends perpendicularly with respect to the plane of the figure.) The electrodes are grouped into two electrode pairs 120*a* and 120*b*, each electrode pair being aligned across axis 115. Each electrode is affixed to and in electrical contact with a corresponding conductive mount 125*a*, 125*b*, 125*c* or 125*d*, which is in turn connected to a corresponding electrical lead 130*a*, 130*b*, 130*c* or 130*d*. An insulative ring 135 (depicted in phantom) or other suitable structure holds the mounts and maintains the fixed spacings of the electrodes. Typically, electrodes 110*a*, 110*b*, 110*c* and 110*d* are positioned in radially symmetric relation such that each of the electrodes is equidistant from the central ion flow axis and the inter-electrode spacings are constant; however, this arrangement should not be considered as limiting, and other geometries may be employed without departing from the scope of the invention.

Figure 2:
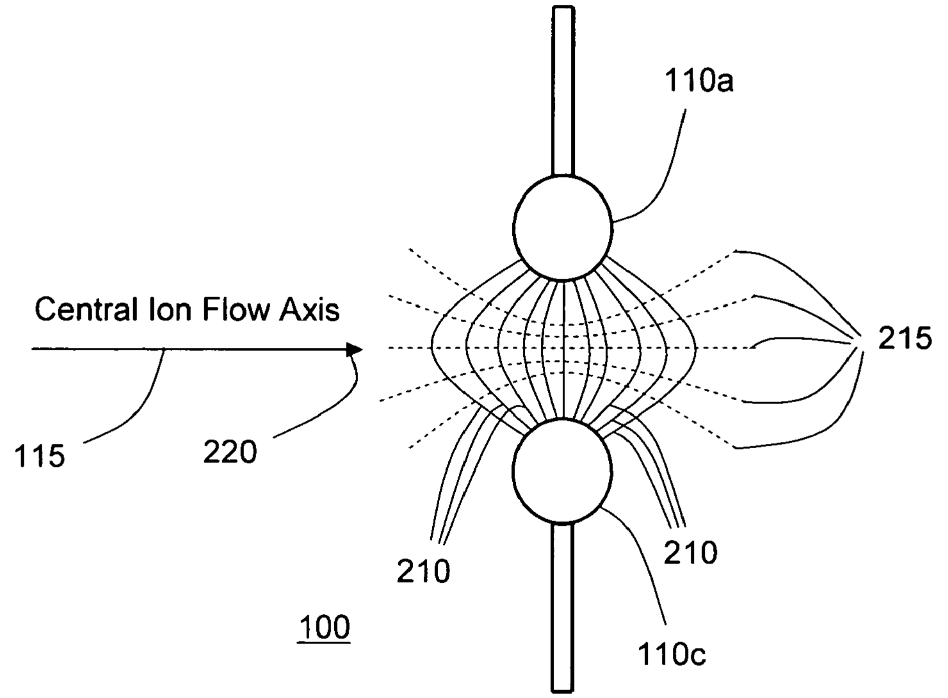
FIG. 2 is a longitudinal cross-sectional view of the FIG. 1 ion guide.

As depicted in FIGS. 1 and 2, electrodes 110*a*, 110*b*, 110*c* and 110*d* each have a generally spheroidal shape, having an inwardly facing surface which is continuously rounded in both the lateral and longitudinal planes (as used herein, the longitudinal plane refers to a plane extending through the central ion flow axis, and the lateral plane refers to a plane oriented perpendicularly with respect to the central ion flow axis.) Electrodes 110a, 110b, 110c and 110d may be fabricated from an electrically conductive material such as stainless steel or aluminum, or alternatively may be fabricated from an insulative material, such as a ceramic, having an outer coating of a conductive material. The optimal size and spacings of electrodes 110a, 100b, 110c and 110d will depend on various operational considerations, including the desired electric field strength and the pressure of the region in which ion guide 100 is located; in a typical implementation, the electrodes have a diameter in the range of 0.040-4.000 inches and have a spacing of 0.001-2.00 inches between electrodes of an electrode pair 120a or 120b.

An RF voltage source 140 applies opposite phases of an RF voltage to electrode pairs 120a and 120b. If desirable, the voltages applied to the electrodes may also include a DC component. The amplitude of the RF voltage will typically be in the range of 10-8000 V, although lesser or greater amplitudes may be used depending on the requirements of the specific application. The resultant electric field serves to focus incoming ions to the central flow axis and to radially confine ions within the ion guide interior region. The electric field generated by ion guide 100 may be more easily understood with reference to FIG. 2, which depicts a longitudinal cross-sectional view of ion guide 100 taken through electrodes 110a and 110c. The mount and ring structures have been omitted from FIG. 2 in the interest of clarity. FIG. 2 depicts electric field lines 210 and equipotentials 215 arising from the application of an RF voltage. It is apparent that, unlike conventional ion guides using cylindrical or similar rod electrodes of constant lateral cross-section, the field lines are straight only at the midpoint of the ion guide (i.e., between the apexes of electrodes 110a and 110c) and are curved both upstream and downstream (the terms upstream and downstream are in reference to the aggregate direction of ion travel, as indicated by arrow 220 of ion central flow axis 115) of the midpoint. It is further noted that the curvature of field lines at and proximal to the entrance of ion guide 100 act to focus incoming ions to ion flow central axis and thereby reduce the width of the ion beam. Ion beam focusing is generally desirable in an ion guide, as it has a beneficial effect on ion transmission efficiency.

Those skilled in the art will also appreciate that the curvature of electric field lines downstream of the ion guide midpoint (i.e., where the opposing surfaces of the electrodes diverge from each other in the direction of ion flow) will have a defocusing effect that will result in expansion of the ion beam width. In order to reduce this defocusing effect and lessen the amount of beam expansion occurring at and proximal to the ion guide exit, an electrode may be placed immediately adjacent (on the downstream side) to ion guide 100. This arrangement will be discussed in further detail hereinbelow in connection with FIG. 4. Defocusing may also be reduced by providing electrodes with a composite structure consisting of a conductive leading portion and an insulative trailing portion, as will be discussed hereinbelow in connection with FIG. 5.

Figure 3A:
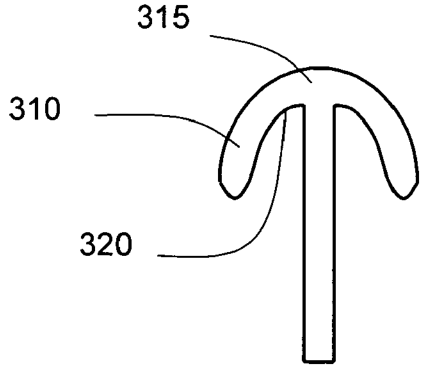
FIGS. 3(*a*)-3(*b*) depict in longitudinal cross-sectional view some alternative electrode shapes.
Figure 3B:
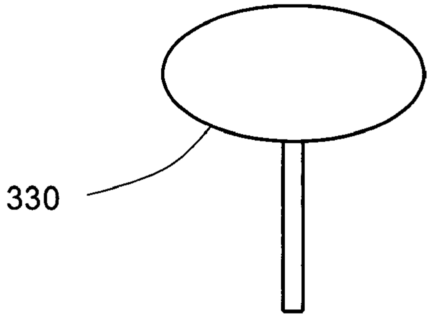

FIGS. 3(a) and 3(b) depict, in longitudinal cross-sectional view, examples of other shapes in which the electrodes may be formed. In FIG. 3(a), electrode 310 has a solid upper portion 315 presenting a generally spheroidal inner surface 320 to the ion guide interior, which overlies a hollowed out lower portion 320. In FIG. 3(b), the longitudinal extent of the electrode has been stretched (relative to the spheroidally-shaped electrode) to produce an ellipsoid-shaped electrode 330 presenting an inwardly facing arcuate surface. In each case, a continuously rounded inner-facing surface is presented in the longitudinal plane.

Figure 4:
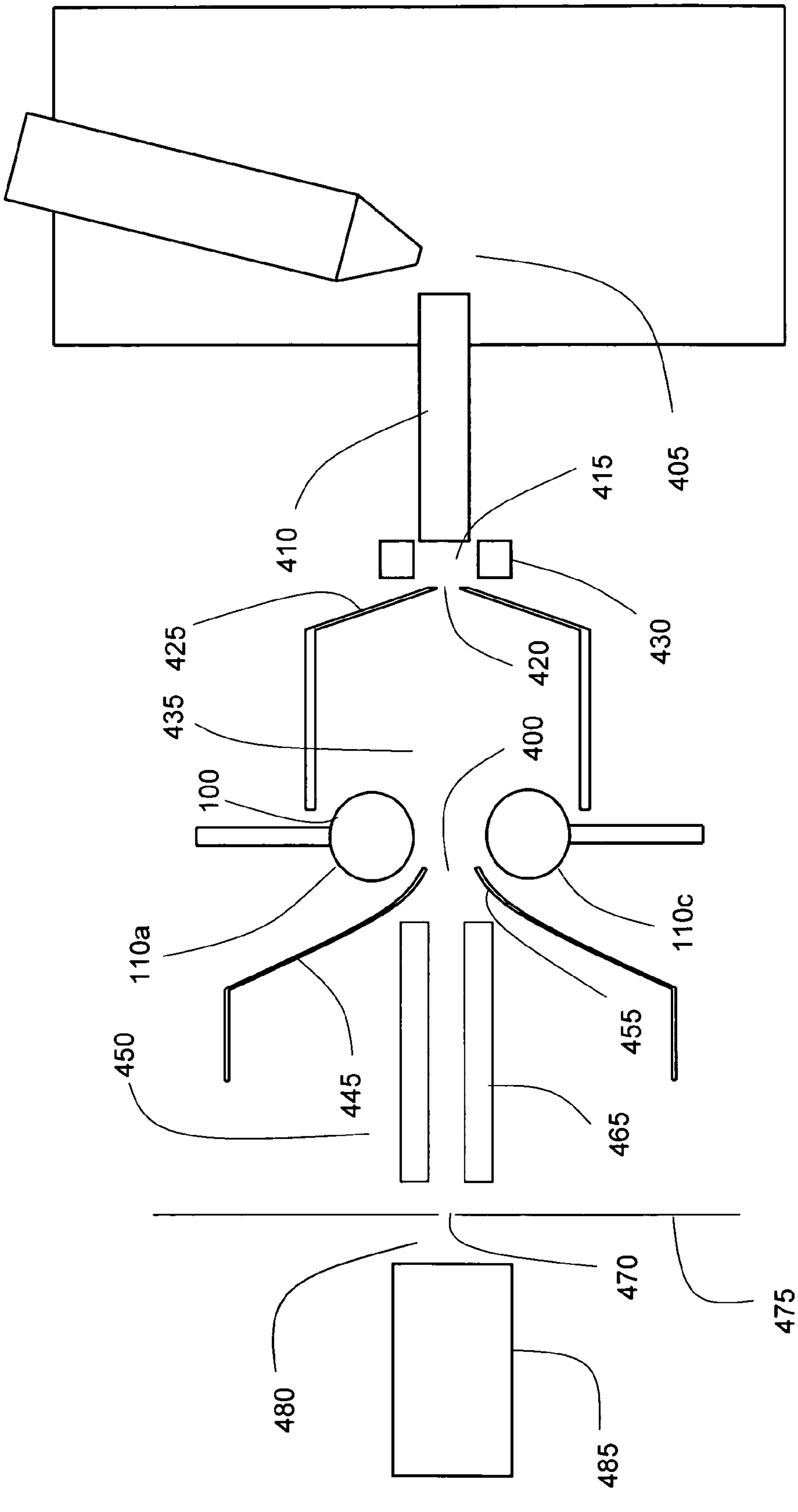
FIG. 4 is a longitudinal cross-sectional view depicting the FIG. 1 ion guide in relation to other components of a mass spectrometer.

FIG. 4 depicts a cross-sectional view of ion guide 100 as placed relative to other components of an exemplary inlet section of a mass spectrometer instrument. To avoid unnecessary complexity, the pumps, chamber walls, and other features known in the art have been omitted from the drawing. An ion stream is produced (for example, by electrospray ionization) within an ionization chamber 405. At least a portion of the ions pass into the entrance end of a narrow-bore ion transfer tube 410 and traverse the length of the tube under the influence of a pressure gradient and/or an electrostatic field. The ion transfer tube may be heated to evaporate residual solvent and to assist in breaking up solvent-ion clusters. Ions exit ion transfer tube 410 into a first reduced pressure region 415. The exiting ions may be focused onto an aperture 420 of skimmer 425 by a tube lens 430. Ion transfer tube 410 may have an axis that is laterally offset with respect to skimmer aperture 420 to prevent streaming of undesolvated droplets into the lower pressure regions and ultimately the mass analyzer. Skimmer 425 will typically have a DC offset applied thereto (relative to upstream and/or downstream components) in order to generate an axial DC field that urges ions downstream and provides some focusing of the ion stream.

Ions enter second reduced pressure region 435 though skimmer aperture 420 as a free jet expansion. Ions travel thereafter to the entrance of ion guide 100. As described above, electric fields generated by the application of RF voltages to the electrodes of ion guide 100 assist in focusing ions to the central ion flow axis. It will be appreciated that those fields extend into region 435 beyond the longitudinal extent of ion guide 100 such that ions "see" the fields (i.e., the trajectories of the ions are influenced by the fields) before they arrive at the ion guide entrance. Ions traverse the length of ion guide 100 and are transported through aperture 440 of skirt electrode 445 into a third reduced pressure region 450. As depicted in FIG. 4, skirt electrode 445 is positioned immediately downstream of ion guide 100 and has a central portion 455 that extends partially within the interior volume of ion guide 100. This central portion 445 provides a termination to the electric field lines emanating from electrodes 100a and 110c downstream of the midpoint, so that the ion defocusing effect produced within the divergent area of the ion guide interior is minimized, thereby reducing expansion of the ion beam and potentially improving ion transmission efficiency.

A DC offset may be applied to skirt electrode 445 to facilitate the transport and focusing of the ion beam within third reduced pressure region 450. Further focusing of the ion beam may be provided by a conventional multipole ion guide 465, consisting of at least four elongated parallel rod electrodes to which an RF voltage is applied. Ions traversing third reduced pressure region thereafter enter (through aperture 470 in partition 475) a fourth reduced pressure region 480 in which a mass analyzer 485 may reside. Mass analyzer 485 may take the form of an ion trap, quadrupole ion filter, or any other mass analyzer type known in the art, and is configured to determine the mass-to-charge ratios of at least a portion of the incoming ions (or product ions derived therefrom.)

It should be recognized that the arrangement of components in the mass spectrometer instrument depicted in FIG. 4 is provided only as an illustrative example, and should not be construed as restricting the ion guide of the invention to any particular configuration or architecture of mass spectrometer instruments.

Figure 5:
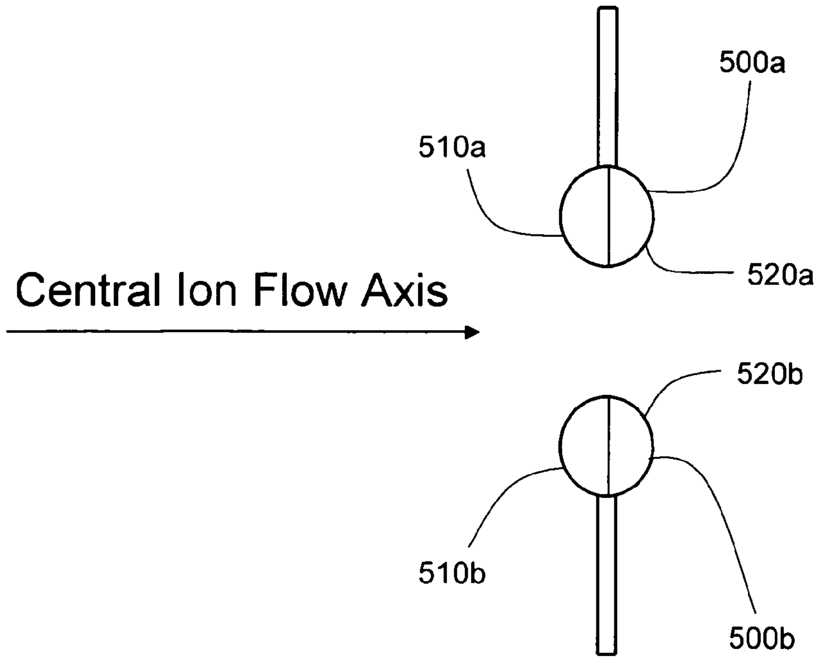
FIG. 5 depicts in longitudinal cross-sectional view an alternative electrode construction, consisting of a conductive leading portion and an insulative trailing portion.

FIG. 5 is a longitudinal cross-sectional view of an alternative construction of an electrode for use in ion guide 100. Electrodes 500a and 500b each have a composite construction consisting of an electrically conductive portion 510a,b and an insulative portion 520a,b. Electrically conductive portion 510*a,b* is located on the leading (entrance) side of the ion guide, and insulative portion 520*a,b* is located on the trailing (exit) side of the ion guide. This construction alters the resultant electric field (relative to the electric field produced by wholly conductive electrodes) such that the ion beam defocusing effect occurring downstream of the ion guide midpoint is reduced. Electrodes 500*a* and 500*b* may each be formed by joining conductive and insulative components each having a hemispheroidal shape, or alternatively by application of a conductive coating to a portion of a spheroidal insulative substrate or of an insulative coating to a portion of a conductive spheroidal substrate.

Figure 6:
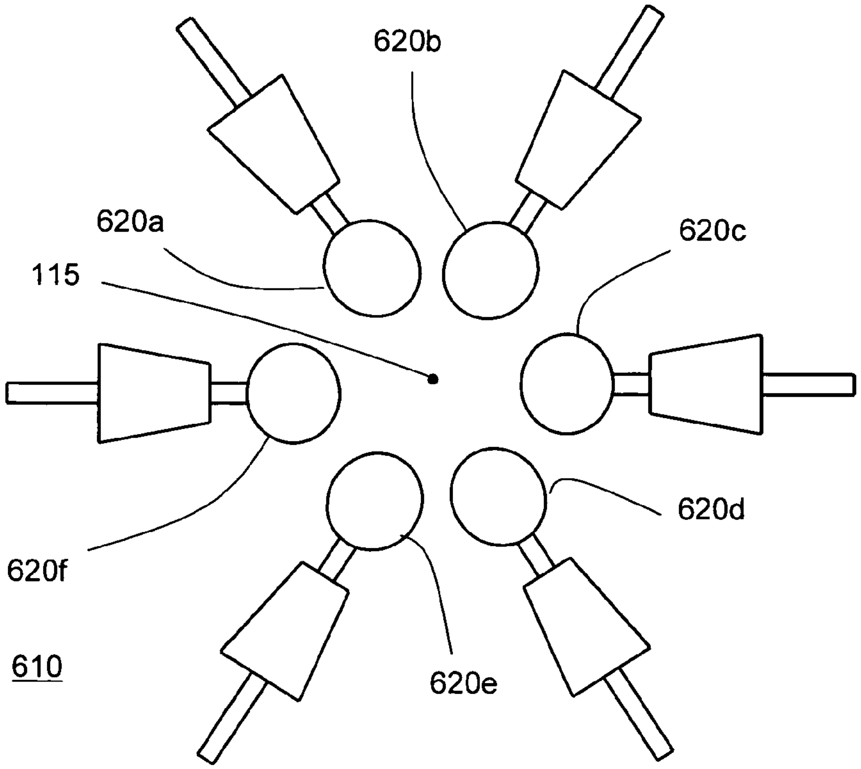
FIG. 6 is a front elevational view of a hexapole ion guide constructed in accordance with another embodiment of the invention.
Figure 7:
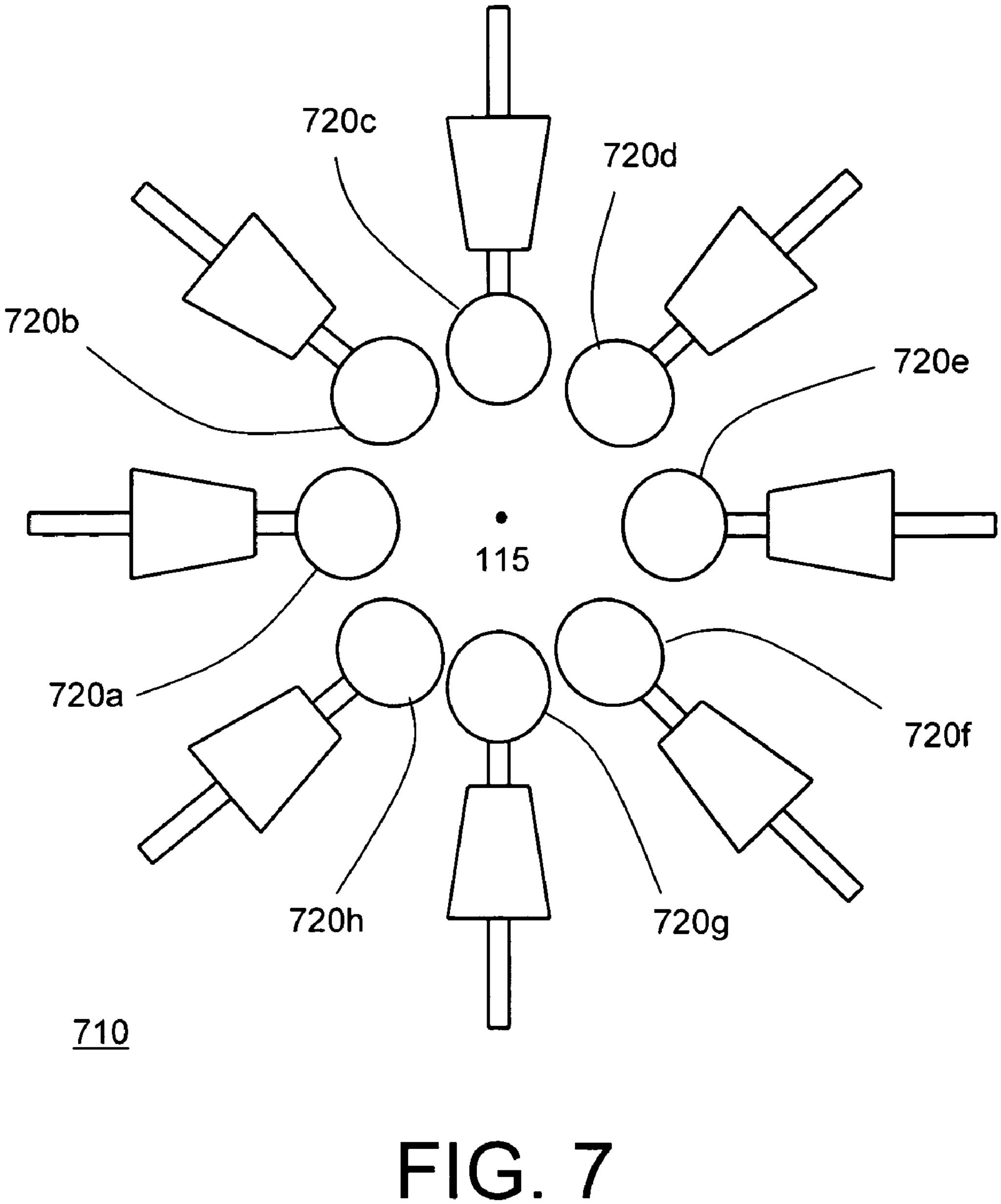
FIG. 7 is a front elevational view of an octopole ion guide constructed in accordance with another embodiment of the invention.

As noted above, the invention is not limited to a quadrupole ion guide implementation, and may instead take the form of a hexapole or higher order ion guide. FIGS. 6 and 7 respectively depict hexapole and octopole ion guides utilizing spheroidal electrodes of the above description. In FIG. 6, hexapole ion guide 610 includes six electrodes 620*a-f* arranged in opposed pairs about the central axis 115. An insulative ring or similar structure (not depicted) may be utilized to fix the electrode spacing. An RF voltage is applied to the electrode pairs in the desired phase relationship to create a hexapolar field that confines and focuses the ion beam. FIG. 7 shows an octopole ion guide 710 having eight electrodes 720*a-h* arranged in opposed pairs about the central axis 115. Again, an RF voltage is applied in a prescribed phase relationship to the electrode pairs to generate an octopole field that confines and focuses ions. While spheroidal electrodes are shown in FIGS. 6 and 7, the hexapole and octopole ion guides may instead utilize electrodes having an ellipsoid or other shape that presents a continuously rounded inwardly-directed inner surface in a longitudinal cross-section.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

We claim:

1. An ion guide comprising:

a plurality of electrodes arranged around a central ion flow axis, each of the plurality of electrodes having a continuously rounded inner surface in a longitudinal plane extending through the ion flow axis, the plurality of electrodes being arranged into a plurality of electrode pairs, each electrode pair having two electrodes opposed across the central ion flow axis; and a radio-frequency (RF) voltage source for applying an RF voltage to the plurality of electrodes.

2. The ion guide of claim 1, wherein each of the plurality of electrodes has a spheroidal shape.

3. The ion guide of claim 1, wherein each of the plurality of electrodes has an ellipsoidal shape.

4. The ion guide of claim 1, wherein the plurality of electrodes includes four electrodes arranged in two electrode pairs.

5. The ion guide of claim 1, further comprising a skirt electrode positioned immediately downstream in the ion path from the plurality of electrodes.

6. The ion guide of claim 1, wherein each electrode includes a conductive leading portion positioned proximal to an entrance of the ion guide and an insulative portion positioned proximal to an exit of the ion guide.

7. The ion guide of claim 1, wherein the plurality of electrodes are arranged in radial symmetry about the central ion flow axis.

8. The ion guide of claim 1, wherein the plurality of electrodes includes six electrodes arranged in three pairs of opposed electrodes.

9. The ion guide of claim 1, wherein the plurality of electrodes includes eight electrodes arranged in four pairs of opposed electrodes.

10. An inlet section for a mass spectrometer, comprising:

an ion source configured to produce ions within an ion chamber, the ions having an ion path; and an ion guide positioned downstream of the ion source in the ion path, the ion guide including a plurality of electrodes arranged around a central ion flow axis, each of the plurality of electrodes having a continuously rounded inner surface in a longitudinal plane extending through the ion flow axis, the plurality of electrodes being arranged into a plurality of electrode pairs, each electrode pair having two electrodes opposed across the central ion flow axis; and a radio-frequency (RF) voltage source for applying an RF voltage to the plurality of electrodes.

11. The inlet section of claim 10, wherein each of the plurality of electrodes has a spheroidal shape.

12. The inlet section of claim 10, wherein each of the plurality of electrodes has an ellipsoidal shape.

13. The inlet section of claim 10, wherein the plurality of electrodes includes four electrodes arranged in two electrode pairs.

14. The inlet section of claim 10, further comprising a skirt electrode positioned immediately downstream in the ion path from the ion guide.

15. The inlet section of claim 10, wherein each electrode includes a conductive leading portion positioned proximal to an entrance of the ion guide and an insulative portion positioned proximal to an exit of the ion guide.

16. The inlet section of claim 10, wherein the plurality of electrodes are arranged in radial symmetry about the central ion flow axis.

17. The inlet section of claim 10, further comprising an ion transfer tube positioned upstream in the ion path of the ion guide.

18. The inlet section of claim 10, further comprising a skimmer positioned upstream in the ion path of the ion guide.

19. The inlet section of claim 10, further comprising a mass analyzer positioned downstream in the ion path of the ion guide.

* * * * *